United States Patent
Boice et al.

(10) Patent No.: US 8,098,729 B2
(45) Date of Patent: Jan. 17, 2012

(54) IMPLEMENTING B-PICTURE SCENE CHANGES

(75) Inventors: Charles Edward Boice, Endicott, NY (US); Charles John Stein, Peckville, PA (US); Krishna Chaitanya Ratakonda, Cross River, NY (US); Edward Francis Westermann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 11/876,690

(22) Filed: Oct. 22, 2007

(65) Prior Publication Data

US 2008/0095232 A1    Apr. 24, 2008

Related U.S. Application Data

(63) Continuation of application No. 10/744,173, filed on Dec. 23, 2003, now Pat. No. 7,308,029.

(51) Int. Cl.
    *H04N 7/12* (2006.01)
(52) U.S. Cl. .............................. 375/240.15; 375/240.12
(58) Field of Classification Search .................. 375/240, 375/240.01, 240.12, 240.15
    See application file for complete search history.

(56) References Cited

U.S. PATENT DOCUMENTS

| | | |
|---|---|---|
| 5,245,436 A | 9/1993 | Alattar |
| 5,500,689 A | 3/1996 | Lam |
| 5,644,504 A | 7/1997 | Boice et al. |
| 5,771,316 A | 6/1998 | Uz |
| 6,040,875 A | 3/2000 | Boice et al. |
| 6,057,893 A | 5/2000 | Kojima et al. |

*Primary Examiner* — Allen Wong
(74) *Attorney, Agent, or Firm* — Joan Pennington

(57) ABSTRACT

A method and apparatus are provided for implementing B-picture scene changes. A prediction stage predicts a B-picture scene change based upon a sequence of statistical information in an encoder order and a reaction stage is responsive to the prediction stage for modifying a quantization scale of a rate control algorithm.

2 Claims, 6 Drawing Sheets

IMPLEMENTING B-PICTURE SCENE CHANGES

This application is a continuation application of Ser. No. 10/744,173 filed on Dec. 23, 2003, U.S. Pat. No. 7,308,029 issued on Dec. 11, 2007.

FIELD OF THE INVENTION

The present invention relates generally to the digital video processing field, and more particularly, relates to a method and apparatus for implementing B-picture scene changes.

DESCRIPTION OF THE RELATED ART

Various arrangements are known in the art for processing digital video. A video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform (DCT), quantization, and variable length coding, all of which are well known in the art. Video compression between pictures is accomplished via a process referred to as motion estimation and compensation, in which a motion vector is used to describe the translation of a set of picture elements (pels) from one picture to another picture. Motion compensation takes advantage of the fact that video sequences are most often highly correlated in time; each frame in any given sequence may be similar to the preceding and following frames. These motion estimation and compensation techniques are also well known in the art.

To carry out the video compression, an encoder scans subsections within each frame, called macro-blocks, and identifies ones that have not changed position from one frame to the next. The encoder also identifies reference macro-blocks while noting their position and direction of motion, and assigns a motion vector, which identifies the motion of the reference block from one frame to another. Only the motion vector and difference data between each reference macro-block and the affected current macro-block is transmitted to the decoder. The decoder stores the information that does not change from frame to frame in its buffer memory and uses it to periodically fill in the macro-blocks of the frame that do not change. The video sequence is subsequently decompressed and displayed.

The MPEG-1 standard was introduced to handle the compressed digital representation of non-video sources of multimedia, and subsequently adapted for the transmission of video signals as long as the video material was first converted from interlaced to progressively scanned format. The MPEG-2 standard was developed to produce higher quality images at higher bit rates for moving images of various applications such as digital storage and communication, and supports both video material in interlaced or progressively scanned formats.

U.S. Pat. No. 5,245,436, issued Sep. 14, 1993 discloses a method and apparatus for detecting a fade within a sequence of digital motion video frames. A first frame and a previous frame are selected from the sequence as first and second regions, respectively, for processing. The mean of the first region and the mean of the second region are each calculated and the relative mean change between the means is determined. A fade is detected if the relative mean change exceeds a first predetermined threshold. Alternatively, a fade is detected if the relative mean change is less than the first predetermined threshold but greater than a second predetermined threshold and the magnitude of the difference between the means is greater than a third predetermined threshold.

U.S. Pat. No. 5,500,689, issued Mar. 19, 1996 discloses a video signal processor including a motion compensated predictive coding data compression system, three adjacent image frames (1, 2, 3) are analyzed to detect a luminance gradient such as is typically associated with image fading. The frames are similarly divided into several segments (A ... L). The sum of the absolute pixel value differences between corresponding segments from adjacent frames is obtained for each of two pairs adjacent frame segments ($DIFF_{1-2}$; $DIFF_{2-3}$). The ratio of the two frame differences (S) is obtained for each segment. Fading is indicated if the ratio remains substantially constant for all or a predetermined number of regions. If fading is detected, any motion vectors generated by the motion coder are assigned a zero value and are not coded.

U.S. Pat. No. 5,771,316, issued Jun. 23, 1998 discloses a rate control algorithm for an MPEG-2 compliant encoder. The rate control algorithm has embodiments useful for constant bit rate and variable bit rate encoding. In particular, the disclosed embodiments relate to fade detection.

U.S. Pat. No. 5,644,504, issued Jul. 1, 1997 and assigned to the present assignee, discloses a digital video encoder processor for discrete cosine transform encoding. The discrete cosine transform encoding includes the encoding steps of (1) determining the discrete cosine transform field or frame type, (2) addressing individual pixels as either (i) vertically adjacent pixels on consecutive Odd and Even field lines, or (ii) vertically adjacent pixels on consecutive Odd field lines, then consecutive Even field lines; or (iii) vertically adjacent pixels on consecutive Even field lines, then consecutive Odd field lines. These subtractions may be performed between (i) consecutive lines, (ii) odd lines, or (iii) even lines. The next step is finding the smallest variance of the above subtractions to determine the discrete cosine transform coding type. The subtractions are carried out in a dynamically partitionable processor having a plurality of datapaths. The datapaths are partitionable by the action of running opcode into (i) a single wide datapath, and (ii) a plurality of narrow datapaths for calculating the absolute value of the difference between two pixels, and accumulating the results of the subtraction.

U.S. Pat. No. 6,040,875, issued Mar. 21, 2000 and assigned to the present assignee, discloses a method to compensate for a fade in a digital video input sequence where the video input sequence is to be compressed according to the MPEG-2 video compression standard. The method comprises a first step of dividing each frame of a current frame into two fields. In a second step, each field of the current frame is divided into at least one field band. In a third step, the luminance and chrominance pixel values are individually summed for the pixels in each field of the current frame. In a fourth step, the luminance pixel values are summed for the pixels in each field band of the current frame. In a fifth step, each respective field band sum and field sum of the current frame is compared with that of the previous frame in the video input sequence. In a sixth step, detection of whether or not a fade has occurred is provided, based upon the comparison in the fifth step. In a seventh step, the encoding algorithm is adjusted if a fade has occurred. Lastly, the first through seventh steps are repeated for at least one subsequent frame in the input video sequence.

In the case of video compression algorithms that use Bi-directionally predicted pictures (B-pictures), a situation encountered where none of the reference or anchor frames yields a good prediction is called a B-picture scene change. When compressing or encoding a video sequence, a need exists for a mechanism to accurately detect B-picture scene changes and to react appropriately to effectively encode the B-picture scene changes to maximize the compressed video stream quality without compromising the output bit rate or the VBV buffer integrity.

SUMMARY OF THE INVENTION

Important aspects of the present invention are to provide a method and apparatus for implementing B-picture scene changes. Other important aspects of the present invention are to provide such method and apparatus for implementing B-picture scene changes substantially without negative effect and that overcome some of the disadvantages of prior art arrangements.

In brief, a method and apparatus are provided for implementing B-picture scene changes. A prediction stage predicts a B-picture scene change based upon a sequence of statistical information in an encoder order and a reaction stage is responsive to the prediction stage for modifying a quantization scale of a rate control algorithm.

In accordance with features of the invention, the prediction stage identifies a history of changes in a video sequence; and compares a current image to be encoded with a past reference image and a future reference image in the encoder order. The prediction stage identifies first differences between the current image and the past reference image, and identifies second differences between the current image and the future reference image. The prediction stage identifies minimum differences between the first and second differences, and compares the identified minimum differences to a scene change threshold value.

In accordance with features of the invention, the reaction stage modifies parts of the rate control algorithm to better recognize the potentially increased coding complexity of this picture. The reaction stage identifies an adjusted target bits to be used for an identified B-picture scene change image. The reaction stage fraction identifies a measure of a local standard deviation (PDiff) that is used to calculate the modified quantization scale of the rate control algorithm together with the identified adjusted target bits.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
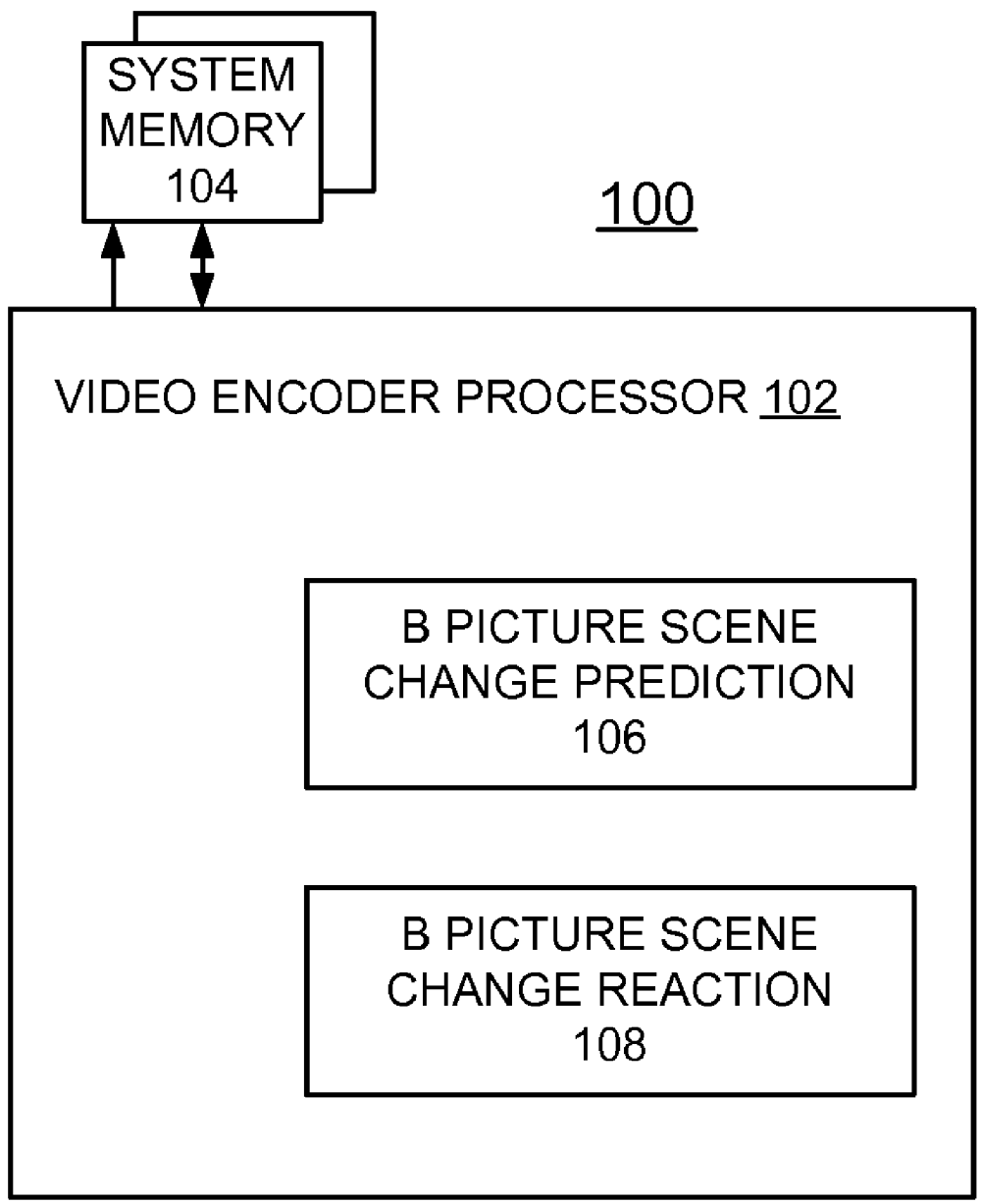
FIG. 1 is block diagram representation illustrating a video encoder processor system for implementing B-picture scene changes in accordance with the preferred embodiment.

Having reference now to the drawings, in FIG. 1, there is shown a video encoder processor system generally designated by the reference character 100 for carrying out methods for implementing B-picture scene changes of the preferred embodiment. As shown in FIG. 1, video encoder processor system 100 includes a video encoder processor 102 and a system memory 104, for example comprising a dynamic random access memory (DRAM). Video encoder processor system 100 includes a B-picture scene change prediction stage 106 of the preferred embodiment and a B-picture scene change reaction stage 108 of the preferred embodiment.

In accordance with features of the preferred embodiment, enhanced more efficient compression is provided for video source material consisting of fades, flash of light from camera flash bulbs, and the like, in such cases, where an abrupt change in video material renders it difficult to compress. In particular, in the case of video compression algorithms that use Bi-directionally predicted pictures (B-pictures), a situation encountered where none of the reference or anchor frames yields a good prediction is called a B-picture scene change. In accordance with features of the invention, higher fidelity compression for such video material is provided through advantageous and novel use of statistical information collected from an input video sequence.

In accordance with features of the preferred embodiment, the prediction stage 106 of the preferred embodiment is particularly suited to practically occurring B-picture scene changes in video sequence and avoids many false alarms and missed detection of B-picture scene changes of prior art arrangements. In the case of B-pictures, the encoder order i.e., the order in which the encoder codes the video frames is different from the order in which the video frames are normally displayed during playback. Noting the changes in encoder order is important in gathering clues as to the nature of the B-picture and categorizing it as a scene change. Some prior art arrangements makes observations using the display order while the present invention uses the encoder order to provide enhanced detection of B-picture scene changes.

In accordance with features of the invention, a history of changes in the video sequence is incorporated into the decision process, thus yielding more reliable scene change information to avoid many false alarms and missed detection of B-picture scene changes of prior art arrangements.

In the prediction stage 106, a sequence of statistical information is relied upon, rather than on individual observations, while at the same time, making these observations in encoder order rather than display order. These new concepts provide advantages over the prior art.

In accordance with features of the preferred embodiment, the reaction stage 108 shifts the emphasis to careful control of the average quantization scale, as this parameter has a better correlation with the perceived compressed video quality than prior art arrangements that place emphasis on the intra/non-intra decision for coding the macro-block. In the reaction stage 108, we rely on adapting the mean quantization scale of the compression scheme that is found to have a better correlation with the compressed video quality. The method of the invention is more successful in both predicting as well as compressing B-picture scene changes.

Figure 2:
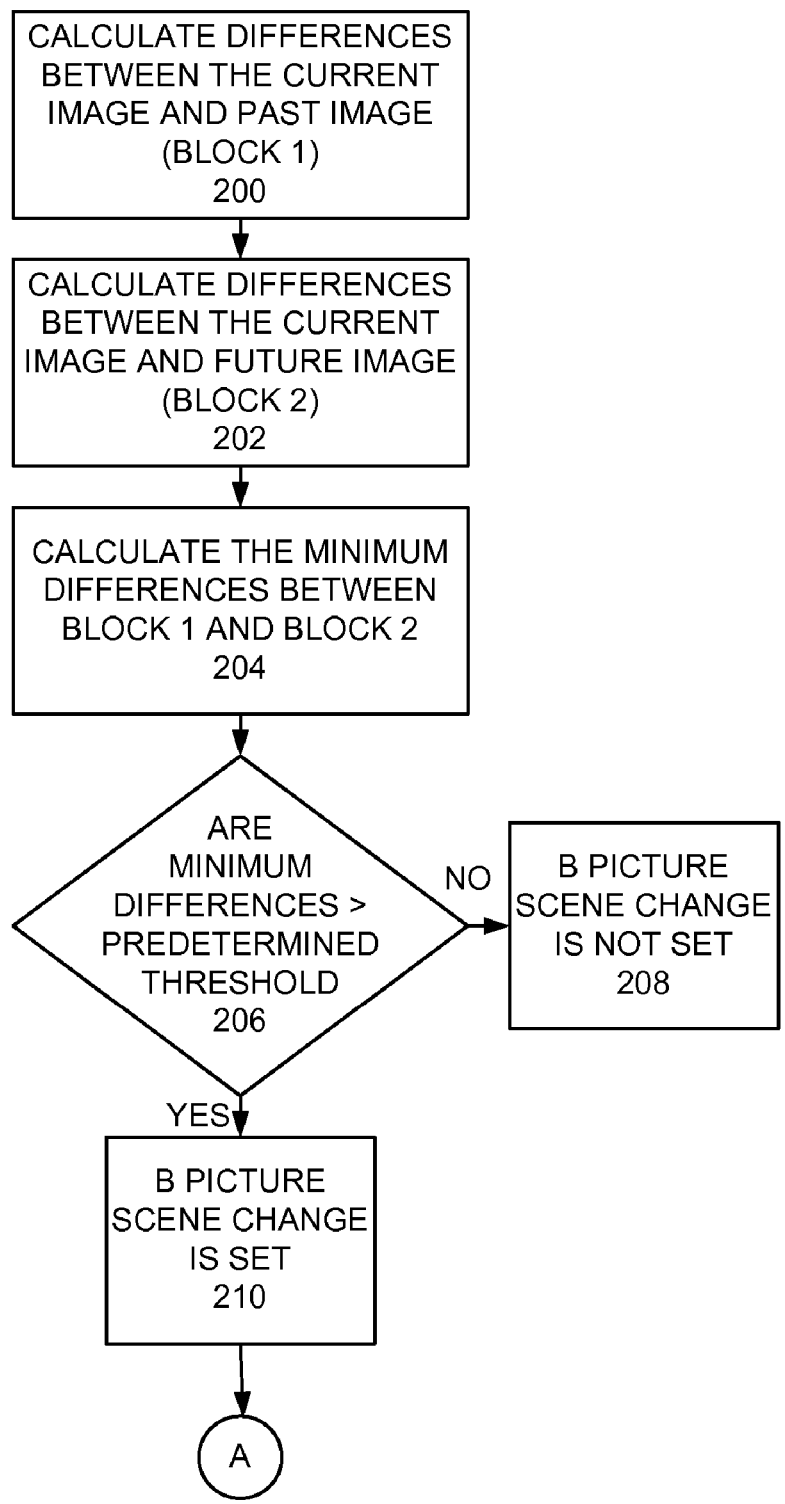
FIG. 2 and FIGS. 3, 4 and 5 are diagrams respectively illustrating exemplary steps performed by a prediction stage and a reaction stage in accordance with the preferred embodiment.

Referring now to FIG. 2, there are shown exemplary steps performed in the prediction stage 106 in accordance with features of the preferred embodiment.

In accordance with features of the preferred embodiment, if the picture to be encoded is a B-picture, the difficulty of encoding it is compared to its past and future references. If both directions contain poor references for this B-picture, then we designate this picture as a B-picture scene change. Note that these comparisons are made in the encoder order and not in the display order. In the case of B-pictures, past and future frames in encoder order are different from their counterparts in display order. This new method accurately characterizes significantly more sources that visually appear to be fades. In addition, the new method has the ability to characterize video material that is difficult to compress, as Bi-directionally predicted pictures, but is not a part of a fade video sequence. This process of comparison is illustrated in FIG. 2 and generally described in pseudo-code as follows:

For a picture "x", we define:

$$PSUM(x)=C1*(\text{mean luminance value of the image})+C2*(\text{mean chrominance value of the image})$$

Further more, we define a scene change threshold as:

$$SC\_T=C3*(\text{number of macro-blocks in a picture})$$

And, further, we define:

$$ABS\_P=|PSUM(B\text{-picture})-PSUM(\text{past reference})|$$

$$ABS\_F=|PSUM(B\text{-picture})-PSUM(\text{future reference})|$$

$$ABS\_PSUM=MIN(ABS\_P,ABS\_F)$$

As indicated in a block 200, differences between the current image and past image are calculated (block 1). Next as indicated in a block 202, differences between the current image and future image are calculated (block 2). Then the minimum differences between block 1 and block 2 are calculated as indicated in a block 204. As indicated in a decision block 206, checking whether the minimum differences are greater than a predetermined threshold is performed.

A B-picture is determined to be a B-picture scene change if the following condition is satisfied:

$$ABS\_PSUM>SC\_T$$

If the minimum differences are not greater than the predetermined threshold SC_T, then a B-picture scene change is not set as indicated in a block 208. When the minimum differences are greater than the predetermined threshold SC_T, then a B-picture scene change is set as indicated in a block 210.

It should be understood that several variations of this algorithm are possible. For example, one may use a linear combination of a measure of the difference data (for example, standard deviation) and mean of the image instead of PSUM. For Gaussian sources, it may be shown that this is equivalent to comparing the histograms of the sources.

It should be understood that the scene change threshold SC_T may be made variable and dependent on an accumulated history of picture-related statistics. For example, the threshold may be constrained to be not less than a fraction, such as one-half, of the average value of ABS_PSUM for the last three B-pictures. ABS_P and ABS_F could be defined as a general function of the difference of the PSUMs; for example, they could be square of the difference of PSUMs. Finally, ABS_PSUM itself may be any monotonically increasing function of ABS_P and ABS_F; for example, reasonable results may be produced also by defining:

$$ABS\_PSUM=MAX(PSUM\_F,PSUM\_P)+MIN(PSUM\_F,PSUM\_P)$$

Figure 3:
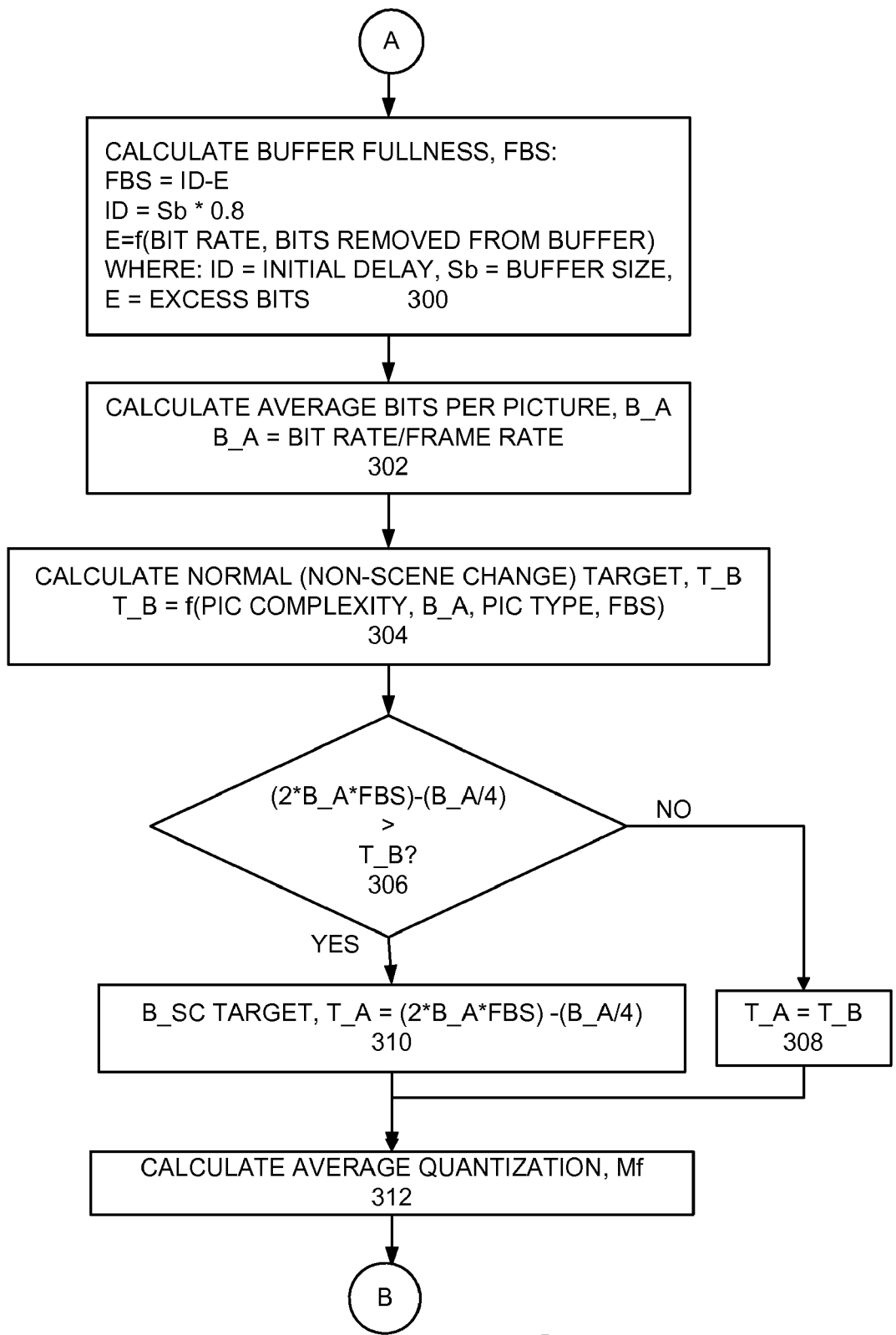
Figure 4:
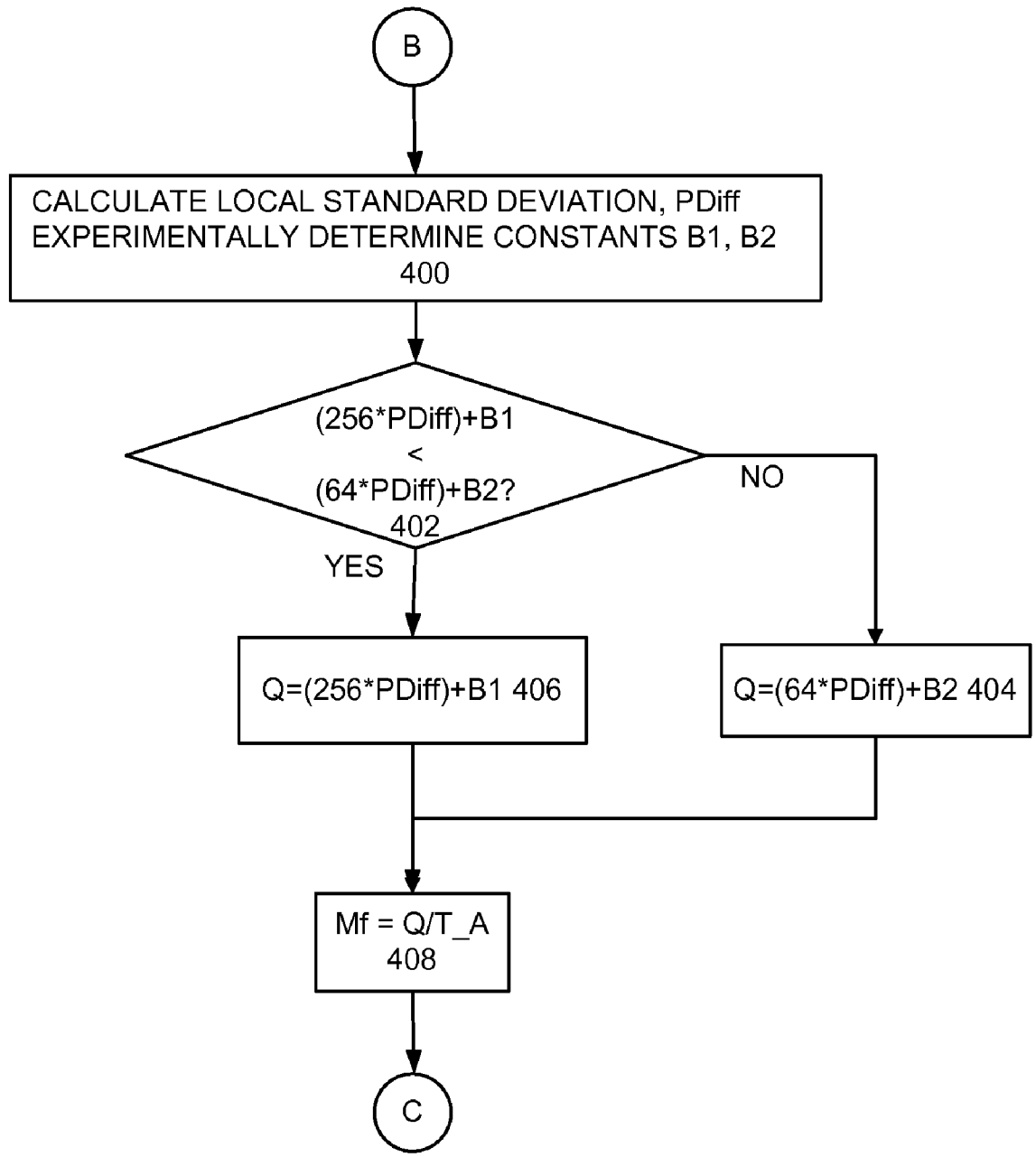
Figure 5:
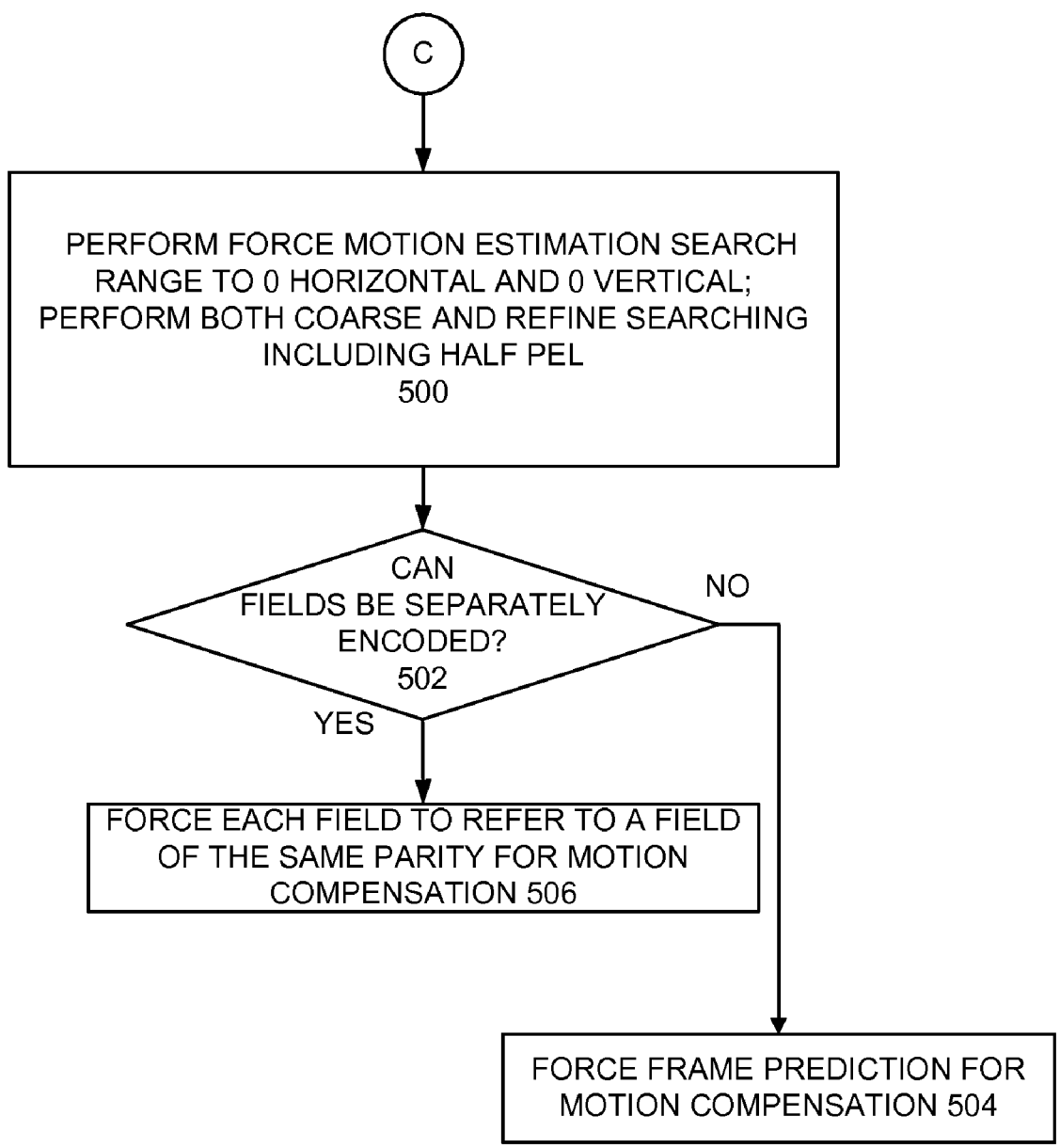

Referring now to FIGS. 3, 4, and 5, there are shown exemplary steps performed in the reaction stage 108 in accordance with features of the preferred embodiment.

Once a particular frame is categorized as a B-picture scene change, parts of the rate control algorithm are modified by the reaction stage 108 to better recognize the potentially increased coding complexity of this picture. In the case of most rate control algorithms, a hypothetical reference decoder (HRD) buffer is carefully monitored at the encoder to avoid overflows and underflows. If we are high in the HRD buffer, it may be worthwhile to allocate the B-picture more bits to better account for its complexity. On the other hand, when we are low down in the HRD buffer, it might be better to skimp on the bit allocation and save for the future.

As a result, a fraction of the decoder buffer fullness (FBS) is an important parameter in the rate allocation.

As indicated in a block 300, the fraction of the decoder buffer fullness (FBS) is calculated. As shown at block 300, $$FBS=ID-E,$$

$$ID=Sb*0.8,$$

$$E=f(\text{bit rate, bits removed from buffer})$$

where ID represents initial delay, Sb represents buffer size and E represents excess bits.

As indicated in a block 302, an average bits per picture B_A is calculated, where B_A equals bit rate divided by frame rate. Next a normal, non-scene change target bits per picture T_B is calculated as indicated in a block 304, where T_B=f(pic complexity, B_A, pic type, FBS).

For a normal B, if our target would have been T_B and average bit rate B_A (bits per second/number of frames per second), the adjusted target bits to be used for our newly discovered B-picture scene change (T_A) is:

$$T\_A=Max(2*B\_A*FBS)-(B\_A/4),T\_B)$$

As indicated in a decision block 306, an adjusted target bits to be used (T_A=Max (2*B_A*FBS)-(B_A/4), T_B)) is determined by comparing (2*B_A*FBS)-(B_A/4) with T_B. If (2*B_A*FBS)-(B_A/4) is less than T_B, the T_A is set equal to T_B as indicated in a block 308. Otherwise when (2*B_A*FBS)-(B_A/4) is less than T_B, the T_A is set equal to (2*B_A*FBS)-(B_A/4) as indicated in a block 310.

Given this allocated bits, we need to choose an average quantization scale Mf that would be a good target for this picture. However, it is clear that due to the change in the picture statistics because of the scene change that Mf cannot be reliably predicted from historical calculations. An average quantization scale Mf is calculated as indicated in a block 312.

Referring now to FIG. 4, there are shown exemplary steps performed in the reaction stage 108 to calculate the average quantization Mf in accordance with features of the preferred embodiment. First as indicated in a block 400, a local standard deviation (PDiff) is calculated, and constants B1, B2 are experimentally determined.

We use a measure of the local standard deviation (PDiff) to predict a new large: Mf, as follows:

$$Min(256*PDiff+B1,64*PDiff+B2)/T\_A$$

where B1 and B2 are experimentally determined constraints.

Further it should be understood that the adjusted target bits T_A can be obtained through any reasonable function of the average bit rate B_A, the fraction of the decoder buffer fullness FBS and the target bits for a normal B T_B; thus the particular function described above should not be thought of as the only good solution. Also it should be understood that the PDiff employed in determining Mf may be replaced by a more general representative of the statistics of the video sequence and the division could be replaced by a suitable approximation such as a table-lookup operation or multiplication by a suitable scaled representation of the reciprocal of T_A.

In accordance with features of the preferred embodiment, further tuning of the rate control algorithm may involve, for example, one or more of the following operations:

1. Force motion estimation to choose zero motion compensation.
2. If fields can be separately encoded, then each field is forced to refer to a field of the same parity for motion compensation purposes.
3. In the case of adaptive frame-field encoding, frame encoding may be forced.

Referring now to FIG. 5, there are shown exemplary steps performed in the reaction stage 108 for motion estimation and motion compensation in accordance with features of the preferred embodiment. As indicated in a block 500, force motion estimation search range is set to 0 horizontal and 0 vertical and both coarse and fine searching, including half pel searching is performed. Checking whether fields can be separately encoded is performed as indicated in a decision block 502. If adaptive frame-field encoding, frame encoding or frame prediction is forced for motion compensation as indicated in a block 504. Otherwise same parity field is forced if the fields can be separately encoded for motion compensation as indicated in a block 506.

Figure 6:
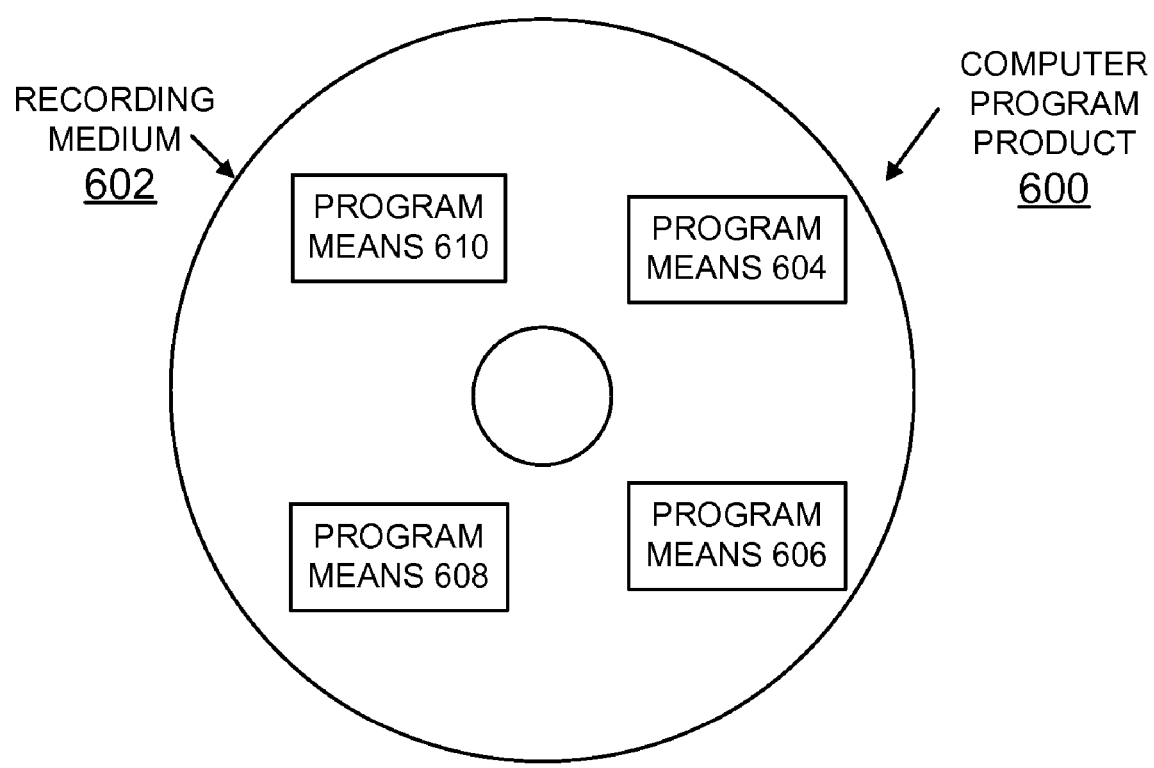
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for implementing B-picture scene changes of the preferred embodiment in the video processor system 100 of FIG. 1.

A sequence of program instructions or a logical assembly of one or more interrelated modules defined by the recorded program means 604, 606, 608, 610, direct the video processor system 100 for implementing B-picture scene changes of the preferred embodiment.

While the present invention has been described with reference to the details of the embodiments of the invention shown in the drawing, these details are not intended to limit the scope of the invention as claimed in the appended claims.

What is claimed is:

1. Apparatus for implementing B-picture scene changes comprising:
    a prediction stage for predicting a B-picture scene change based upon a sequence of statistical information in an encoder order; said encoder order including an input video sequence in an order in which an encoder codes the video frames and said encoder order being different from an order in which video frames are displayed during playback;
    said prediction stage calculating picture values using a luminance value and a chrominance value and identifying a history of changes in said input video sequence in said encoder order; and comparing a current image with a past reference image and a future reference image;
    said prediction stage identifying first differences between said current image and said past reference image, and identifying second differences between said current image and said future reference image;
    said prediction stage identifying minimum differences between said identified first and second differences; and comparing said identified minimum differences with a scene change threshold value to predict said B-picture scene change; and
    a reaction stage responsive to the prediction stage predicting said B-picture scene change for modifying a quantization scale of a rate control algorithm.

2. A method for implementing B-picture scene changes comprising the steps of:
    identifying a sequence of statistical information of an input video sequence in an encoder order; said encoder order including said input video sequence in an order in which an encoder codes video frames and said encoder order being different from an order in which video frames are displayed during playback;
    calculating picture values using a luminance value and a chrominance value and identifying a history of changes in said input video sequence in said encoder order; and comparing a current image with a past reference image and a future reference image;
    identifying first differences between said current image and said past reference image, and identifying second differences between said current image and said future reference image;
    identifying minimum differences between said identified first and second differences; and comparing said identified minimum differences with a scene change threshold value;
    predicting a B-picture scene change responsive to said compared values; and
    responsive to a prediction of said B-picture scene change, modifying a quantization scale of a rate control algorithm.

* * * * *